United States Patent [19]

Odoni et al.

[11] Patent Number: 4,903,785

[45] Date of Patent: Feb. 27, 1990

[54] DRILLING AND CHISELING TOOL BIT

[75] Inventors: Walter Odoni, Vaduz, Liechtenstein; Oliver Berchtold, Zollikon; Wilhelm Gerber, Grabs, both of Switzerland

[73] Assignee: Hilti Aktiengesellschaft, Fürstentum, Liechtenstein

[21] Appl. No.: 289,979

[22] Filed: Dec. 23, 1988

[30] Foreign Application Priority Data

Dec. 23, 1987 [DE] Fed. Rep. of Germany ....... 3743817

[51] Int. Cl.⁴ .............................................. E21B 1/00
[52] U.S. Cl. .................................... 175/293; 173/131; 175/300; 408/226; 408/714
[58] Field of Search ............... 175/293, 300, 302, 303, 175/414; 408/17, 10, 226, 714; 173/131

[56] References Cited

U.S. PATENT DOCUMENTS 2,524,707 10/1950 Koeln ............................ 175/300 X
4,004,643 1/1977 Newman ........................ 175/300 X Primary Examiner—William P. Neuder
Attorney, Agent, or Firm—Toren, McGeady & Associates

[57] ABSTRACT

A drilling and chiseling tool bit includes a tool bit head, an axially extending shank and an insertion end for insertion into a drilling or chiseling device. The shank extends between the tool bit head and the insertion end and is divided into individual axially aligned members. The individual shank members are held together by a retaining member which also interconnects the tool bit head and the insertion end. The tool bit head and insertion end are rotatable as a unit and are movable axially relative to one another. By dividing the shank axially, its individual members have a higher natural frequency and afford improved transmission of impact energy. As a result, preventing the excitation of natural vibrations in individual shank members, the vibration period is shorter compared to the impact transmission time period. Accordingly, the sound radiation from the tool bit is reduced.

9 Claims, 1 Drawing Sheet

U.S. Patent  Feb. 27, 1990  4,903,785
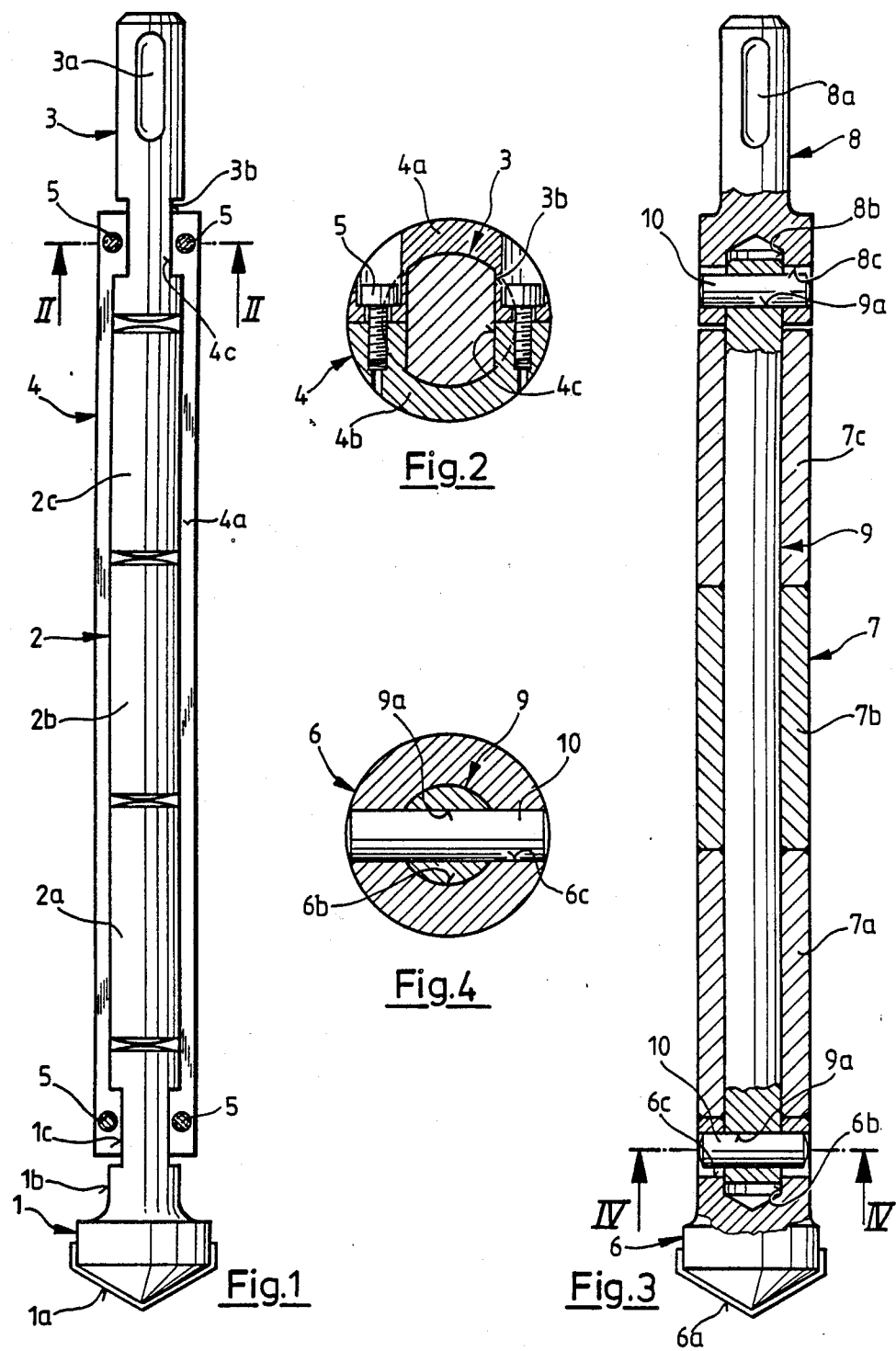

DRILLING AND CHISELING TOOL BIT

BACKGROUND OF THE INVENTION

The present invention is directed to a drilling and chiseling tool bit for working on concrete, rock, masonry and the like, and the tool bit includes a tool bit head, a shank extending from the head to an insertion end and the insertion end is arranged to be engaged with rotational driving means.

Drilling and chiseling tool bits for work on rock are acted on by a driving device, such as a drill or a chisel hammer which imparts relatively high percussion energy to the tool bit. The percussion energy is transmitted from the rear insertion end through the shank to the tool bit head. Percussion energy is divided in the tool into kinetic energy of the center of gravity movement and into vibration energy.

The kinetic energy acts practically exclusively for working on the receiving material. Vibration energy, however, produces vibrations in the tool bit which generates sound radiation and stresses in the bit. The vibration energy contributes little if any work on the receiving material.

Especially long tool bits have low natural frequencies. This can be explained by the circumstance that one vibration period, that is, the time required for sound waves to travel from one sound transmission surface to another sound transmission surface and back, is relatively long. If this time period is longer than the percussion or blow transmitting time period, during which the tool bit contacts the ram or piston of a percussion device, then the natural vibration of the tool bit is excited and a practically unopposed sound vibration is generated which is very unpleasant for the operator and can lead to the damage or destruction of the tool.

SUMMARY OF THE INVENTION

Therefore, the primary object of the present invention is to provide a drilling and chiseling tool bit having lower sound radiation, a higher work performance and a longer service life.

In accordance with the present invention, the shank is divided into individual axially extending members with the mass of each individual member, of the tool bit head and of the insertion end, being substantially the same. Further, the tool bit head and the insertion end are interconnected so that they rotate as a unit, but are axially movable or displaceable relative to one another.

By dividing the shank into separate individual members, the length of the individual members is reduced compared to the length of the shank and, at the same time, the natural frequency of the individual members is increased. Thus, the vibration period is shorter than the blow transmittal time period, whereby natural vibrations of the individual members, the tool bit head, and the insertion end can scarcely be excited. Each individual member of the shank acts in the same manner as a rigid mass. By providing the individual shank members, the insertion end and the tool bit head with approximately the same mass, the transmission of the kinetic energy occurring in accordance with the law of momentum becomes optimal. The mass of the individual members, the insertion end and the tool bit head is approximately equal to the mass of the percussion piston of the driving device generating the percussion energy.

In drill bits, a rotary movement is transmitted from the insertion end to the drill bit head in addition to the impact or percussion energy. Chiseling tool bits also require a rotationally locked connection between the drill bit head and the insertion end, that is, the drill or tool bit head and the insertion end must rotate as a unit. Accordingly, it is important to provide a retaining means for connecting the tool bit head with the insertion end, whereby the retaining means provides rotary entrainment means and axial stop means cooperating with appropriately shaped parts of the insertion end and the tool bit head. As a result, the retaining means serves not only for transmitting rotational movement, it also assures the axial connection of the tool bit head with the insertion end and with the individual shank members arranged between the head and the insertion end. The individual members abut in the axial direction on one another but are not directly connected to one another, thereby affording a simple construction of the individual members. The retaining means serves only for transmitting torque from the insertion end to the tool bit head and it is not stressed by the impact or percussion energy.

Preferably, the retaining means is constructed as an axially extending tube enclosing the individual shank members and interconnecting the tool bit head and the insertion end. As a result, the individual members of the shank are held together and protected by the tube enclosing them. With the tube serving only for the transmission of torque, it can be formed as a relatively thin walled element, and can be connected at its opposite end in a positively locking manner with the tool bit head and the insertion end. Moreover, a relatively rigid tube, for example, of metal, or of elastic materials, such as plastics materials, can be used. Using plastic material tubes affords a reduction in the over-all weight of the drilling and chiseling tool bit.

In another preferred embodiment, an axially extending rod is used as the retaining means extending through the individual shank members in the form of tubular sections and interconnecting the tool bit head and the insertion end. Such a tube extending through the individual members can have a polygonally shaped cross section with the bore extending through the individual members having a corresponding dimension to the rod cross section. In addition, the rod can be connected to the tool bit head and insertion end by pins or similar elements.

The end faces at the opposite ends of the individual members are shaped or cambered for assuring that the transmission of the impact or percussion energy occurs approximately centrally, thereby preventing tilting of the individual members. The radius of the shaped ends of the individual members can be relatively large, so that not only a point-shaped contact is provided between the individual members and the tool bit or the insertion end, but also contact surfaces are elastically developed which serve for the transmission of blows or percussion.

Since the end faces or surfaces of the individual members transmit practically all of the impact or percussion energy, it is desirable to surface harden the end surfaces in order to prevent damage or destruction. With surface hardening, the toughness of the material beneath the end surfaces is maintained. Accordingly, spalling at the end faces of the individual members is avoided.

The tool bit head, the insertion end, and the individual shank members, each have a length preferably of 5 to 15 cm. in the axial direction and, more specifically, preferably about 10 cm. With the length of the individual members, the tool bit head and the insertion end located within such a range, a natural frequency of the tool bit results which is favorable for the transmission of percussion blows, and enables, with appropriate gradation, the use of the same parts for tool bits of different over-all lengths. Accordingly, a variable quantity of the individual shank members can be located between the tool bit head and the insertion end.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an elevational view of a drilling and chiseling tool bit embodying the present invention and shown partly in section;

FIG. 2 is a transverse cross sectional view of the tool bit shown in FIG. 1, taken along the line II—II and displayed on an enlarged scale;

FIG. 3 is a view, similar to FIG. 1, of a tool bit displaying another embodiment of the present invention and illustrated partly in section; and FIG. 4 is a transverse cross sectional view taken along the line IV—IV in FIG. 3, and depicted on an enlarged scale.

DETAILED DESCRIPTION OF THE INVENTION

A drilling and chiseling tool bit as shown in FIGS. 1 and 2, includes a tool bit head 1, an axially elongated shank 2, and an insertion end 3 at the opposite end of the shank from the head. Tool bit head 1 has a hard material cutting plate 1a. On the opposite side of the tool bit head 1, from the cutting plate 1a, is a cylindrically shaped section 1b of smaller diameter than the part of the head supporting the cutting plate. Shank 2 is divided into three separate individual shank members 2a, 2b, 2c, all of the same length and shape. Shank 2 has the same diameter as the adjacent cylindrical part 1b of the head. Insertion end 3 has an axially extending groove 3a for effecting rotational engagement and axial locking of the bit in a driving tool. The insertion end 3 also has two inset flats 3b disposed in parallel relation. An axially extending tube 4 connects the tool bit head 1 with the insertion end 3 so that the two parts rotate together and are axially movable or displaceable to a certain extent relative to one another.

As can be noted in FIG. 2, tube 4 is made up of two axially extending shells or halves 4a, 4b connected together by screws 5 at the opposite ends of the shells. In the end region of the shells 4a, 4b inward projections 4c extend into the recessed parts of the tool bit head forming the flats 1c and of the insertion end forming the flats 3b. The projections 4c bear against the flats 1c, 3b, affording a connection between the tube 4 and the tool bit head 1 at one end, and the insertion end 3 at the other end, so that these three separate parts rotate as unit. When the tool bit is pressed against a work surface, the tool bit head 1, the individual shank members 2a, 2b, 2c and the insertion end 3, are displaced axially until they are in contact with one another. Accordingly, impact or percussion energy is transmitted from the insertion end through the individual members 2a, 2b, 2c of the shank to the tool bit head. Tube 4 laterally enclosing the shank serves merely for transmitting torque as well as axially securing the separate parts together. For replacement of the tool bit head 1, of the individual shank members 2a, 2b, 2c or of the insertion end 3, screws 5, securing the shells or halves 4a, 4b of the tube together, are unscrewed and one of the two shells is removed. After replacement of the appropriate part, the removed shell 4a, 4b is again set in place and the screws 5 are tightened. It is possible to us the same tool bit head 1 and insertion end 3 for tool bits of different lengths by replacing the tube 4, and adapting the number of the individual members 2a, 2b, 2c to the desired length of the tool bit. Tube 4 can be provided with a known conveying spiral rib, not shown, on its outside surface for removing drillings.

In FIGS. 3 and 4, another embodiment of the present invention is displayed where the tool bit includes a tool bit head 6, an axially elongated shank 7, and an insertion end 8. Drill head 6 has a hard metal cutting plate 6a. Drill head 6 has a centrally arranged axially extending blind bore 6b, extending into the head from the end opposite the cutting plate. In addition, drill head 6 also has an elongated hole or bore 6c extending transversely of the axial direction of the bit and extending through the blind bore 6b. As distinguished from the embodiment shown in FIGS. 1 and 2, the shank 7 is a hollow cylindrical member divided into three equal length individual tubular sections 7a, 7b, 7c. Insertion end 8 has an axially extending groove 8a for rotational entrainment and axial locking within a driving tool and, additionally, has a blind bore 8b, extending into its end closer to the tool bit head. In addition, the insertion end has an elongated hole or bore 8c, extending transversely of the axial direction of the bit and located in the region of the blind bore 8b. A rod 9 extends centrally and axially through the shank 7 interconnecting the tool bit head 6 and the insertion end 8. Rod 9 extends into each of the blind bores 6b, 8b and is secured by a pin 10, extending through the elongated holes 6c, 8c. Elongated holes 6c, 8c have a greater diameter than the pin 10, affording a limited axial movement of the tool bit head 6 relative to the insertion end 8. As a result of this axial movement, it is assured that the transmission of the percussion energy from the insertion end 8 to the tool bit head 6 takes place through the shank 7 and not through the rod 9. Rod 9 serves merely for the transmission of torque from the insertion end 8 to the tool bit head 6.

Instead of a rod with a circular cross section, a multi-sided or polygonally-shaped rod can be used and positioned within a correspondingly shaped blind bore in the tool bit head 6 and the insertion end 8. In such an arrangement, pins 10 serves merely for axial retention and can be dimensioned correspondingly smaller, since they do not need to transmit torque from the insertion end 8 to the rod 9, or from the rod 9 to the tool bit head 6. By employing rods 9 of different lengths and an appropriate number of individual shank tubular sections 7a, 7b, 7c, the illustrated tool bit can be relatively easily modified to different working lengths.

While specific embodiments of the invention have been shown and described in detail to illustrate the application of the inventive principles, it will be understood that the invention may be embodied otherwise without departing from such principles.

We claim:

1. A drilling and chiseling tool bit for working in concrete, rock, masonry and the like, comprising an axially elongated shank having a first end and a second end spaced apart in the axial direction, a tool bit head at the first end of said shank and an insertion end at the second end of said shank for insertion into a drilling or chiseling device, said insertion end includes means for rotational entrainment with the drilling or chiseling device, wherein the improvement comprises that said shank is divided into a plurality of axially aligned separate individual shank members of similar length and shape, said tool bit head and said insertion end are separate from said shank, the mass of each of said shank members, said tool bit head and said insertion end is approximately the same, and means separate from said shank for interconnecting said tool bit head and said insertion end so that said head and end are rotationally connected together and are axially movable relative to one another, said interconnecting means for connecting said tool bit head and insertion end comprises means for transmitting torque from said insertion end to said tool bit head and axial stop means cooperating with corresponding means at said tool bit head and insertion end.

2. A drilling and chiseling tool bit, as set forth in claim 1, wherein said interconnecting means comprises an axially extending tube enclosing said individual members and interconnecting said tool bit head and insertion end.

3. A drilling and chiseling tool bit, as set forth in claim 1, wherein said interconnecting means comprises an axially extending rod, said individual members of said shank comprise tubular sections with said rod extending through said tubular sections and interconnecting said tool bit head and insertion end.

4. A drilling and chiseling tool bit, as set forth in claim 1, wherein said individual shank members have opposite end faces with said end faces having a convex curved configuration.

5. A drilling and chiseling tool, bit, as set forth in claim 1, wherein said individual shank members each have oppositely directed end faces and said end faces are surface hardened.

6. A drilling and chiseling tool bit, as set forth in claim 1, wherein the tool bit head, the insertion end, and the individual members of the shank each have an axial length in the range of 5 to 15 cm.

7. A drilling and chiseling tool bit, as set forth in claim 6, wherein said tool bit head, insertion end, and individual shank members, each have an axial length of approximately 10 cm.

8. A drilling and chiseling tool bit, as set forth in claim 1, wherein said interconnecting means includes means for interconnecting said drill head and insertion end for affording relative axial displacement between said tool bit head and insertion end.

9. A drilling and chiseling tool bit, as set forth in claim 2, wherein said tube comprises a pair of axially extending tube halves and means at each of the opposite ends of said tube halves for securing them together.

* * * * *